United States Patent [19]
Kohno et al.

[11] Patent Number: 5,437,501
[45] Date of Patent: Aug. 1, 1995

[54] ANTILOCK MODULATOR

[75] Inventors: Teruhisa Kohno; Taro Segawa, both of Itami, Japan

[73] Assignee: Sumitomo Electric Industries, Ltd., Osaka, Japan

[21] Appl. No.: 196,568

[22] Filed: Feb. 15, 1994

[30] Foreign Application Priority Data

Feb. 16, 1993 [JP] Japan .................. 5-004725 U

[51] Int. Cl.$^6$ ............................... B60T 8/32
[52] U.S. Cl. ................. 303/116.2; 303/117.1; 303/119.1; 303/901; 303/115.4
[58] Field of Search ............... 303/116.2, 117.1, 119.1, 303/900, 901, 113.1, 115.1, 115.3, 115.4, 115.5, 116.1, 116.3, 116.4, 119.2

[56] References Cited

U.S. PATENT DOCUMENTS

| | | | |
|---|---|---|---|
| 5,213,399 | 5/1993 | Burgdorf et al. | 303/116.2 X |
| 5,215,359 | 6/1993 | Burgdorf et al. | 303/116.2 X |
| 5,335,982 | 8/1994 | Ando et al. | 303/117.1 |

FOREIGN PATENT DOCUMENTS

| | | |
|---|---|---|
| 4016751 | 11/1991 | Germany . |
| 4141354 | 6/1993 | Germany . |
| 1306357 | 12/1989 | Japan . |
| 92/16399 | 10/1992 | WIPO . |
| 92/17356 | 10/1992 | WIPO . |

*Primary Examiner*—Douglas C. Butler
*Attorney, Agent, or Firm*—Wenderoth, Lind & Ponack

[57] ABSTRACT

An antilock modulator can maintain a short brake pedal stroke during normal braking operations, which improves the pedal feeling during antilock control, and can prevent unnecessary increases in the pump discharge pressure. The antilock modulator has a main fluid line connecting the wheel brake to the master cylinder and a line branching from the main fluid line and leading to the discharge end of the hydraulic pump. At the branching point is provided a differential pressure-responsive mechanism which shuts off fluid communication between the master cylinder and the discharge end of the pump when the pressure difference between the wheel brake and the master cylinder exceeds a predetermined value, and otherwise allows fluid communication therebetween.

17 Claims, 5 Drawing Sheets

ANTILOCK MODULATOR

BACKGROUND OF THE INVENTION

This invention relates to an antilock modulator for use in an automotive brake system.

FIG. 5 shows a conventional circulation type antilock device comprising a reservoir 2 for storing brake fluid discharged from a wheel brake 1 during antilock control, a single or a plurality of pairs of electromagnetic control valves 4, 5 for controlling the brake pressure on the wheel during antilock by selectively connecting the wheel brake 1 to a main fluid line 9 leading to a master cylinder 3 or a discharge line 10 leading to a reservoir 2 in response to control signals, and a hydraulic pump 6 for sucking and pressurizing the brake fluid in the reservoir 2 to return it to a fluid return point of the main fluid line.

The circulation type antilock device shown in FIG. 5 has a problem in that the hydraulic fluid discharged from the wheel brake 1 while the brake pressure is being reduced during antilock control mode is returned toward the master cylinder by the pump 6, so that a brake pedal 7 and the pipings tend to vibrate due to the pulsation of the pump, thus producing much noise.

An antilock device which is free of this problem is proposed e.g. in Examined Japanese Patent Publication 61-33738. This device has a first check valve provided in the main fluid line between the fluid return point and the master cylinder to allow only a fluid flow from the master cylinder toward the control valves, a second check valve provided in a bypass line connecting the wheel brake to the master cylinder to allow only a fluid flow toward the master cylinder, and an accumulator provided at the outlet side of pump. Since the brake fluid discharged from the pump is accumulated in the accumulator, the pump pulsation decreases.

But for this device, a rather large accumulator is needed, so that the entire device tends to be bulky and costly. Also, since the wheel brake pressure never drops below the pressure necessary to open the second check valve, brake dragging will occur.

Examined Japanese Patent Publication 61-54619 discloses an improved arrangement in which a pressure-adjusting valve is used in place of the accumulator, which acts to discharge pressure fluid pumped out from the hydraulic pump into the reservoir when the pressure of the pumped-out fluid becomes higher by a predetermined value than the fluid pressure produced in the master cylinder.

An antilock device proposed in Examined Japanese Patent Publication 61-16656 employs, in place of the above-described first check valve, a valve device which permits a free fluid flow in both directions while the fluid pressure in the master cylinder is below a predetermined value and permits only a fluid flow from the master cylinder toward the control valves when it exceeds the predetermined value.

But the device of Japanese Examined Patent Publication 61-54619 has the same problem with the device of Japanese Examined Patent Publication 61-33738, i.e. the problem in that the brake pressure never drops below the valve-opening pressure of the second check valve. The device disclosed in Japanese Examined Patent Publication 61-16656 has a problem in that the piston moves during normal braking operations, thus increasing the brake pedal stroke.

Another conceivable arrangement is to use a solenoid valve as the fluid pressure control valve while completely cutting off the fluid flow toward the master cylinder. In this case, if the amount of brake fluid necessary to sharply increase the wheel brake pressure exceeds the amount of the fluid discharged from the pump, the remaining portion of the fluid necessary to increase the brake pressure is supplied from the master cylinder, so that the brake pedal will be pushed in abruptly. On the other hand, while the brake pressure is being reduced or maintained, the pedal position will be constant. In other words, the brake pedal will be alternately stopped and advanced. This worsens the pedal feel.

SUMMARY OF THE INVENTION

An object of this invention is to provide an antilock modulator which is free of these problems and which can provide a good pedal feel.

According to this invention, there is provided an antilock modulator comprising a reservoir for storing brake fluid discharged from a wheel brake during antilock control. A control valve controls the brake pressure for the wheel brake by selectively connecting the wheel brake to the reservoir and a main fluid line leading to a master cylinder. A pump sucks brake fluid from the reservoir and returns it under pressure to a return point of the main fluid line. A shutoff means is provided in the main fluid line between the return point and the master cylinder for checking the fluid flow from the pump toward the master cylinder, and a relief valve directs the brake fluid discharged from the pump toward the reservoir when the discharge pressure of the pump exceeds a predetermined level. The shutoff means comprises a differential pressure-responsive means which operates to close communication between the master cylinder and the pump when the pressure difference between the pressure at a downstream side of the control valve leading to the wheel brake and the pressure at an upstream side of the control valve leading to the master cylinder exceeds a predetermined value and which allows fluid flow in both directions through the differential pressure-responsive means while the pressure difference is not higher than the predetermined value.

The device according to the present invention has a shutoff valve which allows fluid flow in both directions during normal braking operation. Thus, it is not possible that no pressure remains in the wheel brake. Since the shutoff means becomes operative only while the wheel brake pressure is being reduced, i.e. only during an antilock control mode, the pedal stroke will never increase during a normal braking phase.

The control valve may comprise a constant flow valve for feeding brake fluid at a constant flow rate from the upstream side toward the downstream side irrespective of the pressure difference while the brake pressure is on the increase during antilock control. This eliminates bad pedal feel.

Also, the relief valve may comprise a pressure-responsive means which makes it possible to change the relief pressure of the relief valve according to the pressure in the master cylinder. This prevents the pump from being subjected to too large loads.

Moreover, such an antilock modulator may include a bypass line which branches from the main fluid line at a point upstream of the shutoff means and leading to the wheel brake, the bypass line having a check valve which allows only a fluid flow from the wheel brake toward the master cylinder and a throttle means which limits the fluid flow through the bypass line. The shutoff means may be a check valve which allows only a fluid flow from the master cylinder toward the return point.

The above-mentioned arrangement has an advantage in that the wheel brake pressure can be reduced quickly as soon as the master cylinder pressure is released. While the control pressure in the wheel brake is in close proximity to the master cylinder pressure, the pump pulsation may be transmitted to the master cylinder through the check valve. The throttle serves to minimize such transmission of pump pulsation.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
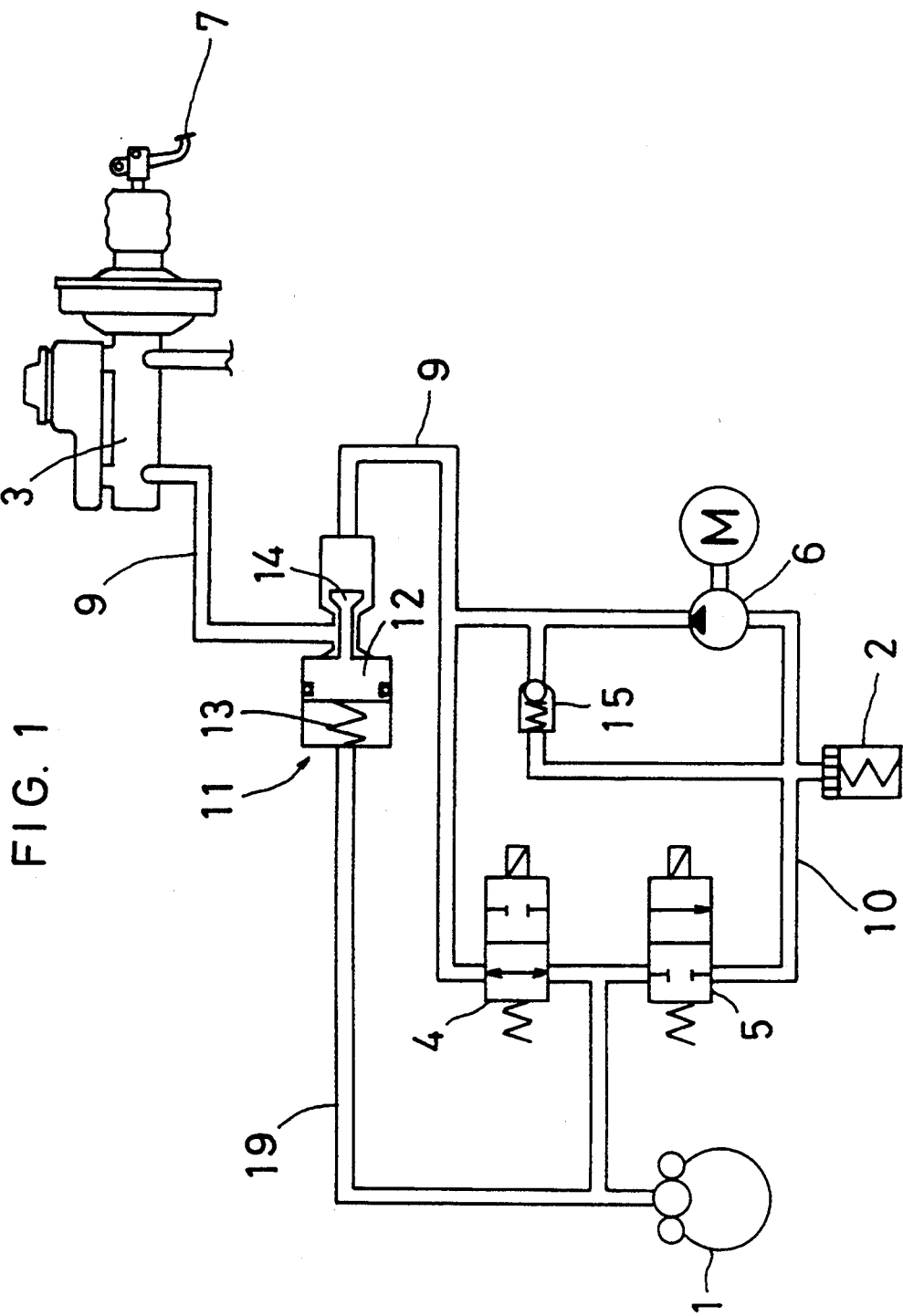
FIG. 1 is a piping diagram of a first embodiment.

Referring to FIG. 1, a differential pressure-responsive means 11 is provided in a main fluid line 9. The differential pressure-responsive means 11 comprises a piston 12 operative in response to the pressure from a wheel brake 1, a spring 13 and a shutoff valve 14 coupled to the piston 12. The shutoff valve 14 is adapted to close the line leading to the master cylinder 3 when the pressure difference between the brake cylinder 1 and the master cylinder 3 rises above a predetermined level. During a normal braking mode, the shutoff valve 14 is kept open.

In the antilock control mode, only when the control valve 4 is closed and the control valve 5 is opened, i.e. the pressure for the wheel brake 1 has decreased, is the shutoff valve 14 closed, thereby shutting off fluid communication between the outlet of the pump 6 and the master cylinder 3. In this state, the pulsation of the pump 6 will never propagate to the master cylinder 3, so that the pedal feel is good. Also, the pedal stroke will never increase.

A relief valve 15 is provided in a line connecting the outlet of the pump 6 to the reservoir 2.

Figure 2:
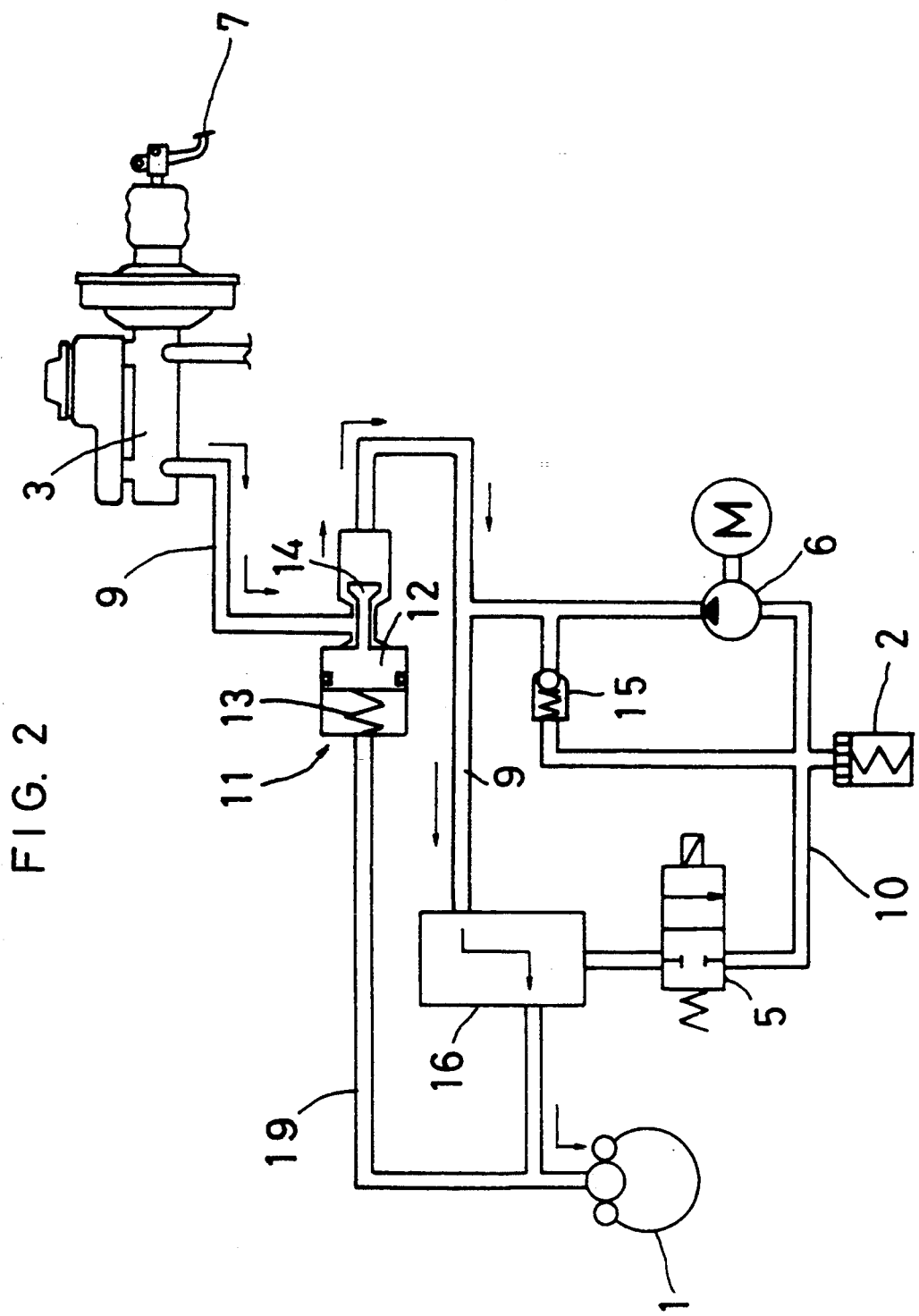
FIG. 2 is a piping diagram of a second embodiment.

FIG. 2 shows another embodiment in which a constant flow valve is used in place of the control valve 4 used in the circuit shown in FIG. 1. This constant flow valve is disclosed in Unexamined Japanese Patent Publication 1-306357

Figure 4:
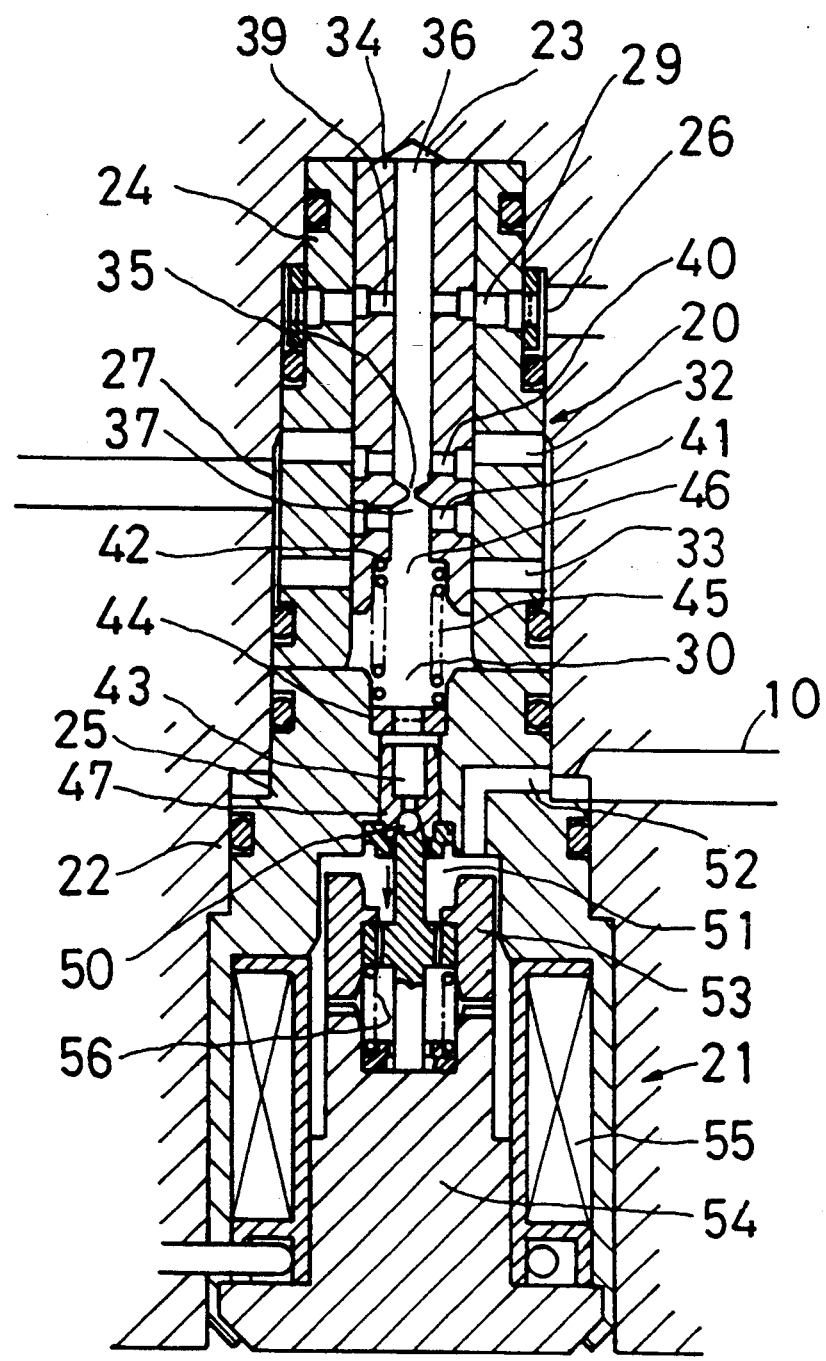
FIG. 4 is a vertical sectional front view of a constant flow valve.
Figure 5:
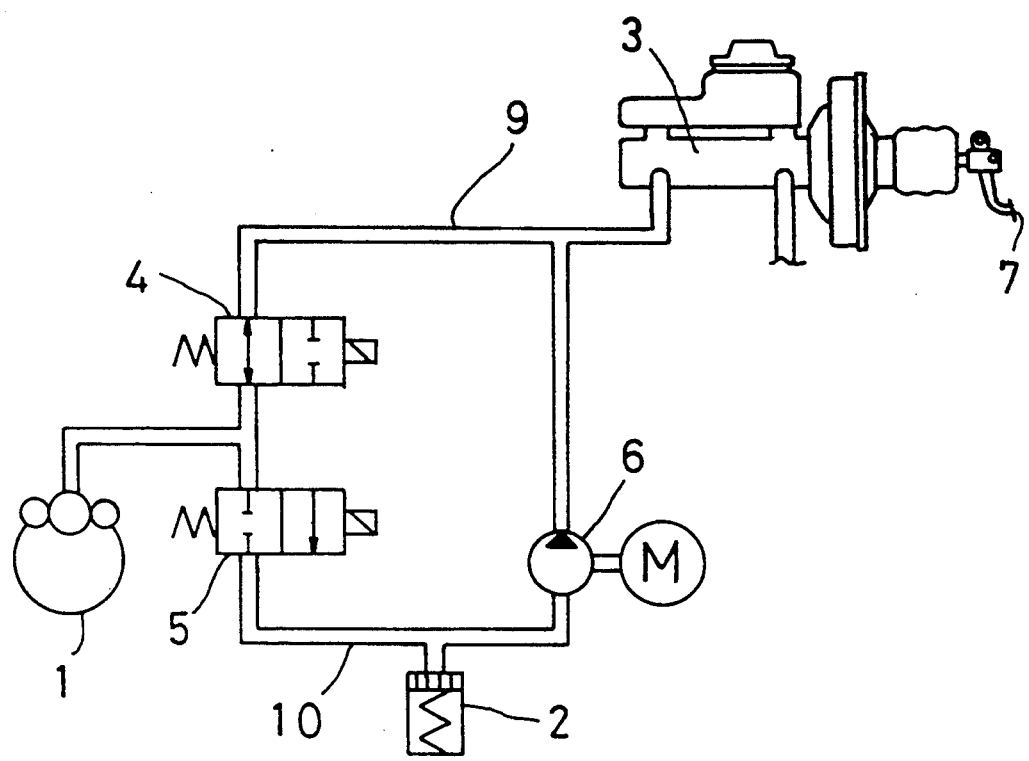
FIG. 5 is piping diagram of a conventional device.

FIG. 4 shows the detailed structure of a constant flow valve 16. It comprises a flow control changeover valve 20 and a discharge valve 21. More precisely, this valve is a combination of the control valves 4 and 5 or a combination of the constant flow valve 16 and the control valve 5. Namely, this valve has a cylinder block 22 formed with a hole 23 in which is fixedly mounted a sleeve 24 of the flow control changeover valve 20.

The discharge valve 21, in the form of a solenoid valve, is mounted in the hole 23 near its opening so as to close the opening. The sleeve 24 has both its ends open, with one end fixed to the bottom of the hole 23. To its other end is connected a frame 25 of the discharge valve 21. Between the outer peripheral surface of the sleeve 24 and the inner peripheral surface of the hole 23 are formed a hydraulic fluid inlet 26 communicating with the main fluid line 9 leading to the master cylinder 3, and a first hydraulic fluid outlet 27 communicating with the wheel brake 1. The opening of the sleeve 24 near the frame 25 serves as a second hydraulic fluid outlet 30 through which the axial bore in the sleeve is in direct communication with the discharge valve 21.

The sleeve 24 is formed, from its bottom side, with an inlet passage 29 extending diametrically therethrough and communicating with the inlet 26 and first and second outlet passages 32, 33 extending diametrically therethrough and communicating with the first outlet 27. Axially slidably mounted in the sleeve 24 is a spool 34 having first and second fluid passages 36, 37 extending axially therein and communicating with each other through an orifice 35. The spool 34 is formed, from its bottom side, with third and fourth fluid passages 39, 40 extending diametrically therethrough and communicating with the first fluid passage 36, and a fifth fluid passage 41 extending diametrically therethrough and communicating with the second fluid passage 37.

The third fluid passage 39 comes into and out of communication with the inlet passage 29 and thus the inlet 26, as the spool 34 moves. Its outer openings are metal-edged. The fourth and fifth fluid passages 40 and 41 are provided in front of and to the rear of the orifice 35 and serve to open and close the first and second outlet passages 32, 33 as the spool 34 moves.

The spool 34 is provided at its leading end with a spring support 42. A return spring 45 is mounted in a compressed state between the spring support 42 and a spring support 44 fixed at the inner side of a fluid passage 43 formed in the frame 25 and communicating with the second outlet 30 of the sleeve 24.

The frame 25 of the discharge valve 21 is mounted so as to close the opening of the hole 23. As shown, the fluid passage 43 is formed at the inner end of the frame 25 along its axis so as to be coaxial with and communicate with the second outlet 30. In the fluid passage 43 is fixed a valve seat 47 which can be opened and closed by a movable valve body 50, to be described later. Since the second outlet 30 is formed in the axial opening end of the sleeve 24 so as to extend in the same direction as the discharge valve 21 in series, hydraulic fluid is introduced in a straight line through the second outlet 30 into the discharge valve 21.

The frame 25 of the discharge valve 21 is formed with a large-diameter bore 51 along its axis so as to communicate with the fluid passage 43, which communicates with the second outlet 30, and is further formed with a discharge passage 52 through which the bore 51 communicates with the discharge line 10. The valve seat 47 is fixedly mounted in the fluid passage 43, whereas an armature 53 is axially slidably mounted in the bore 51. The fixed valve seat 47 is opened and closed by the armature 53 and the movable valve body 50. In the frame 25 is mounted a stator 54 carrying a coil 55 therearound and disposed opposite to the armature 53. By activating the coil 55, the armature 53 and the movable valve body 50 will move in the direction of the illustrated arrow, thus opening the valve seat 47. A spring 56 is mounted between the armature 53 and the stator 54 so as to bias the movable valve body 50 to close the valve seat 47 while the coil is deactivated.

Now, the operation of the constant flow valve 16 is described. While the antilock control is off, the spool 34 is at its upper limit as shown in FIG. 4, so that the portion of the fluid line 9 leading to the master cylinder and its portion leading to the wheel brake communicate with each other.

In this non-antilock state, since the electromagnetic discharge valve 21, and thus the coil 55, are deactivated, the valve seat 47 is closed by the movable valve body 50, so that the second outlet 30 of the flow control changeover valve 20 is closed. In this non-antilock state, the inlet passage 29 in the sleeve 24, which normally communicates with the hydraulic fluid inlet 26, is kept in communication with the third fluid passage 39 formed in the spool 34, while the fourth fluid passage 40 is in communication with the first outlet passage 32 in the sleeve 24. Thus, the inlet 26 of the flow control changeover valve 20 is in communication with the first outlet 27 through a wide fluid passage made up of the inlet passage 29→third fluid passage 39→first fluid passage 36→fourth fluid passage 40→first outlet passage 32. In this state, when the brake pedal 7 is depressed, the hydraulic pressure generated in the master cylinder 3 is transmitted to the wheel brake 1 as shown by arrows in FIG. 2, so that the wheel brake pressure is kept proportional to the stroke of the brake pedal.

If a wheel speed sensor (not shown) detects the occurrence of wheel slip or any sign of wheel slip, the antilock control will start. Namely, the coil 55 of the electromagnetic discharge valve 21 is activated, so that the armature 53 is lowered. The movable valve body 50, connected to the armature, is thus also lowered against the spring 56, thereby opening the valve seat 47. In this state, hydraulic fluid is allowed to flow out through the second outlet 30 of the flow control changeover valve 20. As a result, there appears a difference between the pressure at the top end face of the spool 34, which communicates with the inlet 26, inlet passage 29, third fluid passage 39 and first fluid passage 36, and the pressure at the bottom end of the spool 34, which communicates with the second outlet 30.

Due to this pressure differential, the spool 34 will be moved downwards against the force of the spring 45. As a result, fluid communication is cut off between the fourth fluid passage 40 in the spool 34 and the first outlet passage 32 in the sleeve 24. Namely, the wide fluid passage is closed. In this state, the fifth fluid passage 41 in the spool 34 and the second outlet passage 33 in the sleeve 24 do not communicate with each other, so that the supply of hydraulic fluid to the wheel brake 1 is stopped.

When hydraulic fluid is further discharged through the discharge valve 21, and the spool 34 descends slightly, the fifth fluid passage 41 in the spool 34 comes into communication with the outlet passage 33 in the sleeve 24, while the first outlet 27 is brought into communication with the second outlet 30 through the diametric second outlet passage 33 and fifth fluid passage 41, the axial second fluid passage 37 and a spring housing 46. Namely, a pressure reducing passage opens. In this state, the hydraulic fluid in the wheel brake 1 flows through the first and second outlets 27 and 30 and through the discharge valve 21, which is now open, into the discharge line 10. The brake pressure is thus reduced, i.e. the antilock control is now operative.

As the spool 34 further descends, the third fluid passage 39 moves to a position where it is out of communication with the inlet passage 29. Hydraulic fluid is thus prevented from flowing in through the inlet 26. In this state, the pressures in the first fluid passage 36 upstream and downstream of the orifice 35 balance at the level represented by the formula:

$$P + F/A$$

where A is the sectional area of the spool 34; F is the force of the return spring 45; and P is the brake pressure (which is equal to the pressure in the second fluid passage 37 in this state). Hereinafter, the value F/A is simply referred to as $\Delta P$. As long as the discharge valve is activated, the brake pressure P will be reduced while maintaining this balanced state.

When the pressure in the wheel brake 1 decreases to a sufficient level as a result of antilock control, the shutoff valve 14 is closed, shutting off fluid communication between the master cylinder 3 and the pump 6. Thus, in this state, the pulsation of the pump 6 will never be transferred to the cylinder 3, so that a good pedal feeling is maintained.

When the antilock control turns to a pressure increase phase and the discharge valve 21 is deactivated, the movable valve body 50, biased by the spring 56, is moved to the position where it closes the valve seat 47. The discharge valve 21 is thus closed. Hydraulic fluid is now prevented from flowing out through the second outlet 30 of the flow control changeover valve 20. In this state, while the pressure difference between the pressure source pressure and the wheel brake pressure is greater than a predetermined value $\Delta P$, which is determined by the force of the return spring 45 biasing the spool 34 and the sectional area of the spool 34, there exists a pressure difference equal to $\Delta P$ between the upstream and downstream sides of the fixed orifice 35 provided in the spool 34. Thus, a variable orifice is formed between the inlet passage 29 and the fluid passage 39 to allow the passage of hydraulic fluid therethrough at a flow rate determined by the above pressure difference and the area of the fixed orifice 35.

In this state, hydraulic fluid flows from the pressure source to the wheel brake through both orifices in series at the above-defined low rate. Namely, while the above-mentioned pressure difference is greater than $\Delta P$, the spool 34 is pushed down, thus narrowing the opening between the inlet passage 29 and the third fluid passage 39. When it is smaller than $\Delta P$, the spool 34 is pushed up, so that the above opening widens. Thus, this opening serves as a variable orifice through which hydraulic fluid flows at a variable rate which is determined so that the pressure difference at both ends of the fixed orifice is kept constant.

Since the pressure difference is maintained at the constant level $\Delta P$, the flow rate of hydraulic fluid through the fixed orifice 35 is also kept constant. Thus, the size of the variable orifice is automatically adjusted in such a manner that hydraulic fluid flows through the variable orifice at the same rate as the hydraulic fluid that flows through the fixed orifice.

In this state, hydraulic fluid flows at a low rate through the inlet 26→inlet passage 29 of the sleeve 24→third fluid passage 39 in the spool 34→first fluid passage 36→orifice 35→second fluid passage 37→fifth fluid passage 41→second outlet passage 33→first outlet 27. The hydraulic fluid that flows through the orifice 35 is thus supplied to the wheel brake 1 at a low flow rate, so that the brake pressure increases slowly.

In this state, part of the high-pressure hydraulic fluid supplied from the inlet passage 29 may leak through a gap between the spool and the sleeve into the second fluid passage 37. This possible path of hydraulic fluid extends parallel to the variable orifice but in series with the fixed orifice. Thus, as long as such leakage is less than the flow rate of hydraulic fluid through the fixed orifice, it will pose no practical problem, because the variable orifice is automatically adjusted in such a way as to compensate for such leakage. Any gap between the spool and the sleeve at other portions are subjected to only the pressure equal to the differential pressure $\Delta P$. Thus, leakage through such gaps will be negligibly small.

By supplying hydraulic fluid toward the first outlet 27 at a low flow rate, the pressure difference between the inlet 26 and the first outlet 27 will gradually decrease. When it decreases to $\Delta P$, the spool 34 will return to the position shown in FIG. 4 biased by the return spring 45. Hydraulic fluid now flows at a high rate.

Figure 3:
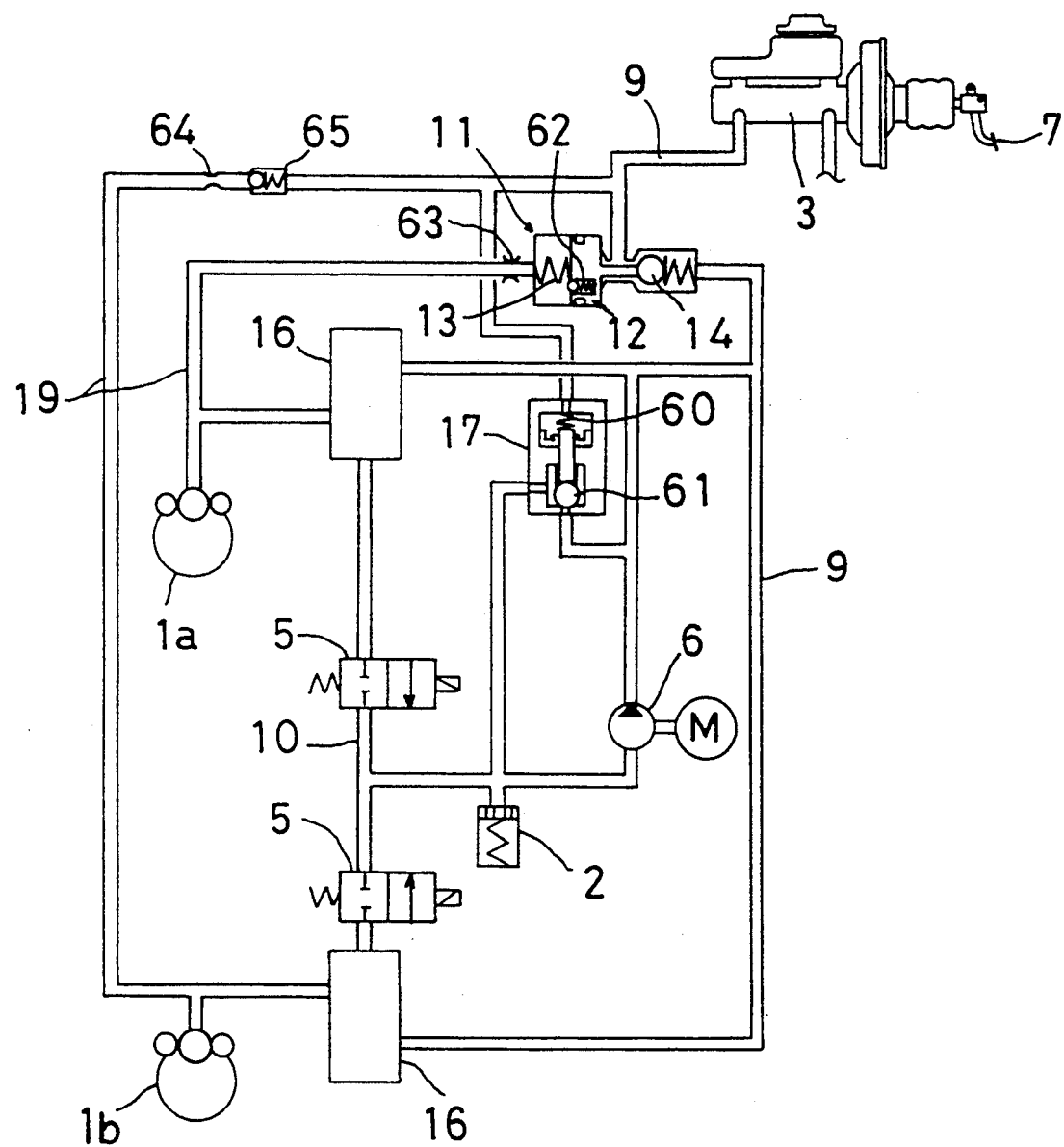
FIG. 3 is a piping diagram of a third embodiment.

FIG. 3 shows an embodiment in which a pressure-responsive relief valve 17 is provided together with the constant flow valve 16. When the discharge pressure of the pump 6 reaches a predetermined level, a spring 60 is compressed, allowing a valve body 61 to separate from a valve seat, so that hydraulic fluid is returned to the reservoir 2. Excessive increases in pressure are thus prevented.

In the embodiment shown, a front wheel brake 1a and a rear wheel brake 1b are connected to a single command line. In the respective oil passages are provided separate constant flow valves 16, while other parts are commonly used for both brakes. Throttles 63 and 64 are provided in the respective return lines 19 leading to the cylinder 3. In the return line 19 leading to the rear wheel brake is further provided a check valve 65 for the rear brake.

The shutoff valve 14 is provided with a check valve 62 for the front brake so that the pressure in the wheel brake 1a or 1b can be reduced smoothly even if the brakes are released if the master cylinder 3 is shut off, i.e. during antilock control.

While the control pressure in the wheel brake 1a or 1b is in close proximity to the pressure in the master cylinder 3, the valve-opening pressure of the check valve 62 or 65 is so small that the pulsation of the pump will be transmitted to the master cylinder 3. The throttles 63, 64 are provided to minimize such transmission of pump pulsation. Also, as shown in the figure, if only the wheel brake 1a in the same line is antilock-controlled, the pump pulsation will be transmitted to the master cylinder 3 through the check valve 62. The throttle 63 serves to check such pulsation, too. Also, since the shutoff means are in the form of check valves, it is possible to increase the brake pressure easily by increasing the master cylinder pressure when it is necessary to increase the wheel brake pressure higher than the pressure during antilock control.

What is claimed is:

1. An antilock modulator, comprising:
a master cylinder;
a main fluid line connected to said master cylinder, said main fluid line having a return point therein;
a wheel brake-for receiving brake fluid therein for the application of braking pressure;
a reservoir for storing brake fluid discharged from said wheel brake during antilock control;
a control valve arrangement connected with said wheel brake, said reservoir and said main fluid line for controlling the brake pressure of said wheel brake by selectively connecting said wheel brake with said reservoir and said main fluid line connected to said master cylinder;
a pump fluidly connected between said reservoir and said return point in said main fluid line for sucking brake fluid from said reservoir and returning the brake fluid under pressure to said return point of said main fluid line;
a shutoff means in said main fluid line between said return point and said master cylinder for checking brake fluid flow from said pump toward said master cylinder; and
a relief valve for directing brake fluid discharged from said pump toward said reservoir when the brake fluid discharge pressure of said pump exceeds a predetermined level;
wherein said shutoff means comprises a fixed valve seat and a movable valve body, and wherein said valve body comprises a differential pressure-responsive means for closing fluid communication between said master cylinder and said pump when the pressure difference between the pressure on a first side of said control valve between said control valve and said wheel brake and the pressure at a second side of said control valve between said control valve and said master cylinder exceeds a predetermined value and for allowing fluid flow in both directions through said differential pressure-responsive means when said pressure difference is not higher than said predetermined value.

2. The antilock modulator of claim 1, wherein said control valve comprises means for feeding brake fluid at a constant flow rate from said first side of said control valve toward said second side of said control valve, irrespective of said pressure difference, when the brake pressure is increasing during antilock control.

3. The antilock modulator of claim 2, wherein said relief valve comprises a means responsive to a pressure differential for enabling a change of said predetermined level of brake fluid pressure in accordance with the brake fluid pressure in said master cylinder.

4. The antilock modulator of claim 3, wherein a bypass line extends from said main fluid line from a point between said shutoff means and said master cylinder, said bypass line having a check valve therein for allowing fluid flow only from said wheel brake toward said master cylinder and a throttle therein, said throttle limiting fluid flow through said bypass line.

5. The antilock modulator of claim 4, wherein said shutoff means comprises a check valve for allowing only a fluid flow from said master cylinder toward said return point.

6. The antilock modulator of claim 4, wherein said shutoff means comprises a check valve for allowing only a fluid flow from said master cylinder toward said return point.

7. The antilock modulator of claim 3, wherein said shutoff means comprises a check valve for allowing only a fluid flow from said master cylinder toward said return point.

8. The antilock modulator of claim 2, wherein a bypass line extends from said main fluid line from a point between said shutoff means and said master cylinder, said bypass line having a check valve therein for allowing fluid flow only from said wheel brake toward said master cylinder and a throttle therein limiting fluid flow through said bypass line.

9. The antilock modulator of claim 2, wherein said shutoff means comprises a check valve for allowing only a fluid flow from said master cylinder toward said return point.

10. The antilock modulator of claim 1, wherein said relief valve comprises a means responsive to a pressure differential for enabling a change of said predetermined level of brake fluid pressure in accordance with the brake fluid pressure in said master cylinder.

11. The antilock modulator of claim 10, wherein a bypass line extends from said main fluid line from a point between said shutoff means and said master cylinder, said bypass line having a check valve therein for allowing fluid flow only from said wheel brake toward said master cylinder and a throttle therein limiting fluid flow through said bypass line.

12. The antilock modulator of claim 10, wherein said shutoff means comprises a check valve for allowing only a fluid flow from said master cylinder toward said return point.

13. The antilock modulator of claim 11, wherein a bypass line extends from said main fluid line from a point between said shutoff means and said master cylinder, said bypass line having a check valve therein for allowing fluid flow only from said wheel brake toward said master cylinder and a throttle therein for limiting fluid flow through said bypass line.

14. The antilock modulator of claim 13, wherein said shutoff means comprises a check valve for allowing only a fluid flow from said master cylinder toward said return point.

15. The antilock modulator of claim 1, wherein said shutoff means comprises a check valve for allowing only a fluid flow from said master cylinder toward said return point.

16. An antilock modulator, comprising:
 a master cylinder;
 a main fluid line connected to said master cylinder, said main fluid line having a return point therein;
 a wheel brake for receiving brake fluid therein for the application of braking pressure, said wheel brake being connected to said master cylinder through said main fluid line;
 a reservoir for storing brake fluid discharged from said wheel brake during antilock control;
 a control valve connected between said wheel brake and said main fluid line and connected to said reservoir for controlling the brake pressure of said wheel brake by selectively connecting said wheel brake with said reservoir and said master cylinder;
 a pump fluidly connected between said reservoir and said return point in said main fluid line for sucking brake fluid from said reservoir and returning the brake fluid under pressure to said return point of said main fluid line;
 a relief valve fluidly connected between a point between said pump and said return point and said reservoir for directing brake fluid discharged from said pump toward said reservoir when the brake fluid discharge pressure of said pump exceeds a predetermined level;
 a shutoff in said main fluid line between said return point and said master cylinder comprising a fixed valve seat and a movable valve body, wherein said valve body comprises a differential pressure-responsive means for closing fluid communication between said master cylinder and said pump when the pressure difference between the pressure on a first side of said control valve leading to said wheel brake and the pressure on a second side of said control valve leading to said master cylinder exceeds a predetermined value and for allowing fluid flow in both directions through said differential pressure-responsive means when said pressure difference is not higher than said predetermined value.

17. The antilock modulator of claim 16, wherein a fluid line interconnects a point on said second side of said control valve with said differential pressure-responsive means.

* * * * *